(12) United States Patent
Kuki

(10) Patent No.: US 9,746,715 B2
(45) Date of Patent: Aug. 29, 2017

(54) LIQUID CRYSTAL DISPLAY DEVICE, ELECTRONIC APPARATUS, AND METHOD FOR MANUFACTURING LIQUID CRYSTAL DISPLAY DEVICE

(71) Applicant: Japan Display Inc., Tokyo (JP)

(72) Inventor: Yuichiro Kuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 83 days.

(21) Appl. No.: 14/184,310

(22) Filed: Feb. 19, 2014

(65) Prior Publication Data
US 2014/0267970 A1 Sep. 18, 2014

(30) Foreign Application Priority Data

Mar. 13, 2013 (JP) .................. 2013-050887

(51) Int. Cl.
*G02F 1/1339* (2006.01)
*G02F 1/1341* (2006.01)
*G02F 1/1333* (2006.01)

(52) U.S. Cl.
CPC .......... *G02F 1/1339* (2013.01); *G02F 1/1341* (2013.01); *G02F 1/133371* (2013.01)

(58) Field of Classification Search
CPC .. G02F 1/1339; G02F 1/136; G02F 1/133371; G02F 1/1341
USPC ........................................ 349/154
See application file for complete search history.

(56) References Cited

U.S. PATENT DOCUMENTS

| 5,933,209 A * | 8/1999 | Yonemoto ............. G02F 1/1341 349/153 |
| 2002/0163615 A1* | 11/2002 | Fujioka ................. G02F 1/1339 349/154 |
| 2010/0002182 A1* | 1/2010 | Lee ....................... G02F 1/1341 349/154 |
| 2010/0014043 A1* | 1/2010 | Ootaguro .............. G02F 1/1339 349/154 |
| 2010/0259707 A1* | 10/2010 | Iwata ................ G02F 1/133351 349/73 |

(Continued)

FOREIGN PATENT DOCUMENTS

| JP | 10-123540 | 5/1998 |
| JP | 2010-243979 | 10/2010 |

(Continued)

OTHER PUBLICATIONS

Japanese Office Action issued Feb. 2, 2016 in corresponding Japanese Application No. 2013-050887.

*Primary Examiner* — Charles Chang
(74) *Attorney, Agent, or Firm* — K&L Gates LLP

(57) ABSTRACT

According to an aspect, a liquid crystal display device includes: a first substrate on which a metallic layer and an insulating layer are laminated; a second substrate having a color filter and a protection layer laminated thereon; a liquid crystal; a seal material provided so as to seal the liquid crystal; a liquid crystal injection inlet formed on an outer circumference of the seal material; a first protrusion formed of at least one of the metallic layer and the insulating layer in the vicinity of each side of the liquid crystal injection inlet on the first substrate; and a second protrusion formed of at least one of the color filter and the protection layer on a position facing the first protrusion on the second substrate.

10 Claims, 15 Drawing Sheets

(56) References Cited

U.S. PATENT DOCUMENTS

2011/0205477 A1    8/2011  Akai et al.
2012/0287391 A1*  11/2012  Makimoto ............ G02F 1/1339
                                                           349/154

FOREIGN PATENT DOCUMENTS

JP      2011-170233     9/2011
JP      2011-180549     9/2011

* cited by examiner

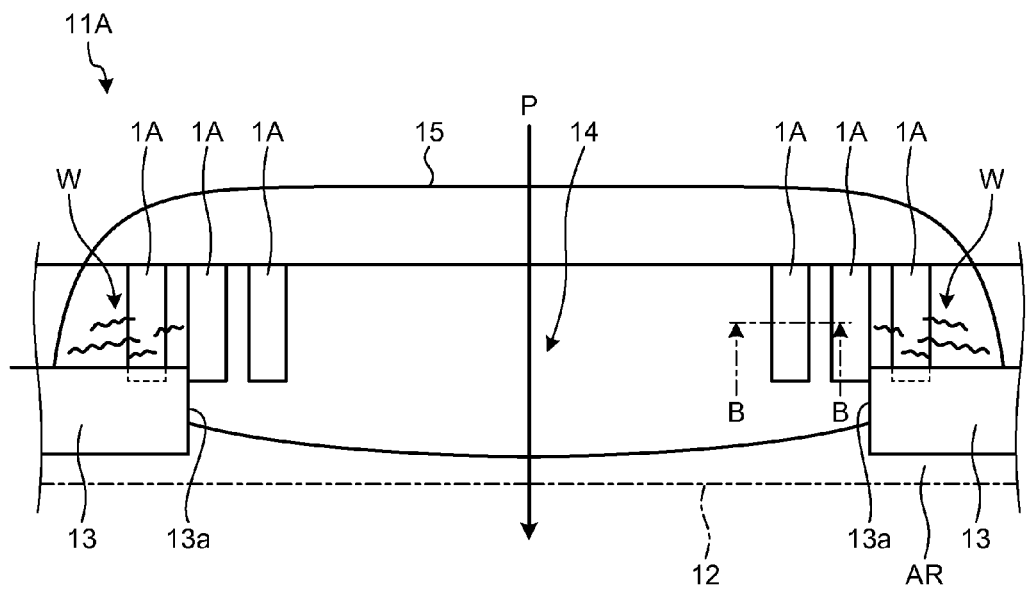
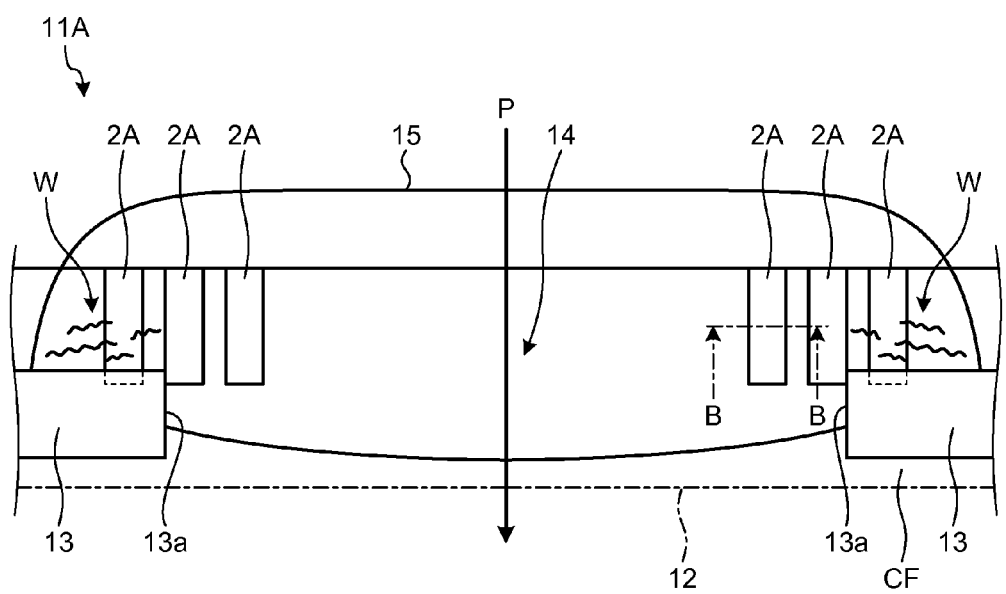

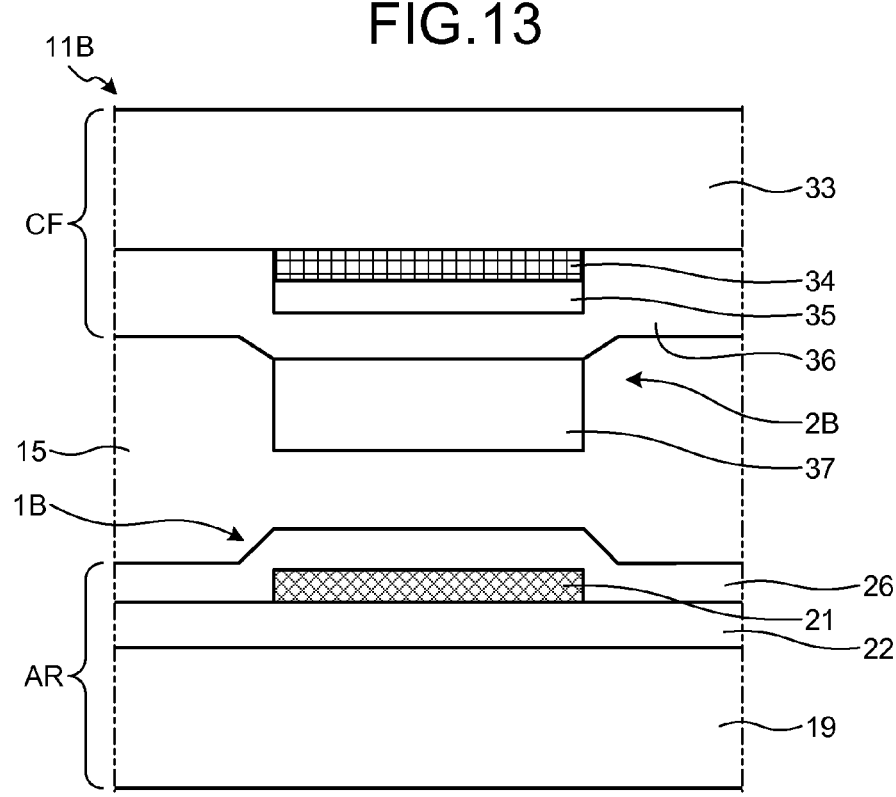
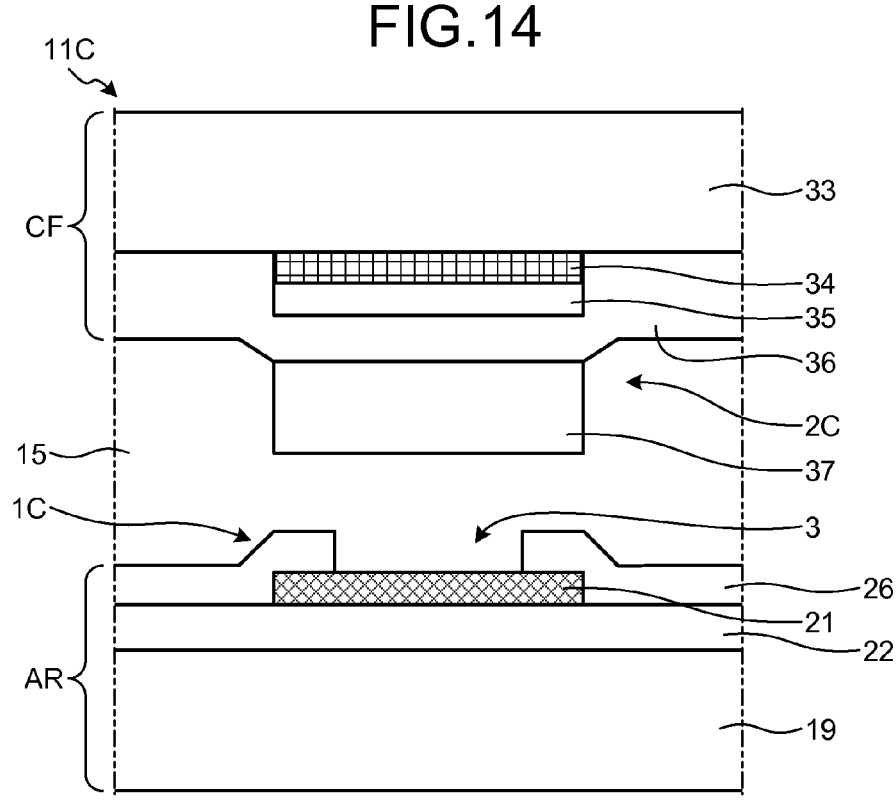

LIQUID CRYSTAL DISPLAY DEVICE, ELECTRONIC APPARATUS, AND METHOD FOR MANUFACTURING LIQUID CRYSTAL DISPLAY DEVICE

CROSS REFERENCES TO RELATED APPLICATIONS

The present application claims priority to Japanese Priority Patent Application JP 2013-050887 filed in the Japan Patent Office on Mar. 13, 2013, the entire content of which is hereby incorporated by reference.

BACKGROUND

1. Technical Field

The present disclosure relates to a liquid crystal display device, an electronic apparatus, and a method for manufacturing the liquid crystal display device.

2. Description of the Related Art

Liquid crystal display devices have liquid crystal filled between substrates and control the behavior of the liquid crystal molecules by controlling the electric field generated between the substrates. Examples of methods for manufacturing a liquid crystal display device includes a technology that a liquid crystal injection inlet is formed on a part of a seal material, from which the liquid crystal is injected into the liquid crystal display device, and then a filling material is filled in the liquid crystal injection inlet to seal it (refer to Japanese Patent Application Laid-open Publication No. 2011-170233 (JP-A-2011-170233)). In the description of JP-A-2011-170233, an outward folded part is formed on an end portion of the liquid crystal injection inlet of the seal material.

As described in JP-A-2011-170233, forming the outward folded part on an end portion of the liquid crystal injection inlet of the seal material suppresses crease-like deformation (hereinafter, simply referred to as a crease) which is likely generated on the filling material and from which bubbles may enter.

In recent years, when liquid crystal display devices are manufactured by using a mother substrate (mother glass), the interval between panels each serving as a liquid crystal display device is desired to be made narrower in order to efficiently manufacture liquid crystal display devices. If the interval between panels each serving as a liquid crystal display device is narrow, that is, a vacant space is small as described above, enough space cannot be obtained for forming the folded part of the seal material. Accordingly, the folded part cannot be formed on the liquid crystal injection inlet, or if formed, the folded part cannot fully function. This may generate a crease in the filling material, which progresses toward the display area, resulting in intrusion of bubbles into the display area.

For the foregoing reasons, there is a need for a liquid crystal display device, an electronic apparatus, and a method for manufacturing the liquid crystal display device that can suppress the progress of creases generated in a filling material.

SUMMARY

According to an aspect, a liquid crystal display device includes: a first substrate on which a metallic layer and an insulating layer are laminated; a second substrate arranged so as to face the first substrate, the second substrate having a color filter and a protection layer laminated thereon; a liquid crystal interposed between the first substrate and the second substrate; a seal material provided between the first substrate and the second substrate so as to seal the liquid crystal; a liquid crystal injection inlet formed on an outer circumference of the seal material as an opening for injecting the liquid crystal; a first protrusion formed of at least one of the metallic layer and the insulating layer in the vicinity of each side of the liquid crystal injection inlet on the first substrate, the first protrusion extending in a direction inwardly from the outer circumference and protruding toward the second substrate; and a second protrusion formed of at least one of the color filter and the protection layer on a position facing the first protrusion on the second substrate, the second protrusion protruding toward the first substrate.

According to another aspect, an electronic apparatus including the liquid crystal display device.

According to another aspect, a method is for manufacturing a liquid crystal display device including: a first substrate having a metallic layer and an insulating layer laminated thereon; a second substrate disposed so as to face the first substrate and having a color filter and a protection layer laminated thereon; a liquid crystal interposed between the first substrate and the second substrate; a seal material provided between the first substrate and the second substrate so as to seal the liquid crystal; and a liquid crystal injection inlet formed on an outer circumference of the seal material as an opening for injecting the liquid crystal. The method for manufacturing the liquid crystal display device includes: manufacturing the first substrate by laminating the metallic layer and the insulating layer on a substrate; and manufacturing the second substrate by laminating the color filter and the protection layer on a substrate. At the manufacturing of the first substrate, a first protrusion protruding toward the second substrate and extending in a direction inwardly from the outer circumference is formed in the vicinity of each side of the liquid crystal injection inlet on the first substrate, by laminating at least one of the metallic layer and the insulating layer, and at the manufacturing of the second substrate, a second protrusion protruding toward the first substrate is formed on the second substrate on a position facing the first protrusion, by laminating at least one of the color filter and the protection layer.

Additional features and advantages are described herein, and will be apparent from the following Detailed Description and the figures.

BRIEF DESCRIPTION OF THE FIGURES

FIG. 4 is a plan view illustrating a first protrusion;

FIG. 5 is a plan view illustrating a second protrusion;

FIG. 13 is a cross-sectional view of first and second protrusions in a liquid crystal display device according to a second embodiment;

FIG. 14 is a cross-sectional view of first and second protrusions in a liquid crystal display device according to a third embodiment;

DETAILED DESCRIPTION

Embodiments for practicing the present disclosure will be described in detail with reference to the accompanying drawings. The description of the embodiments below will not limit the present disclosure. The components described below include components easily conceived by those skilled in the art and components substantially identical thereto. The components described below can also be combined as appropriate. The description will be made in the following order.

1. Embodiments (liquid crystal display device and method for manufacturing the liquid crystal display device)
  1-1. First Embodiment
  1-2. Second Embodiment
  1-3. Third Embodiment
2. Application examples (electronic apparatus)
  Examples in which a liquid crystal display device according to one of the above-described embodiments is applied to an electronic apparatus
3. Aspects of the present disclosure 1. Embodiments
1-1. Embodiment 1
Configuration Example The following describes a liquid crystal display device according to a first embodiment. The liquid crystal display device 11A according to the first embodiment operates in the fringe field switching (FFS) mode by using an amorphous silicon (a-Si) thin film transistor (TFT).

Configuration of the Liquid Crystal Display Device

Figure 1:
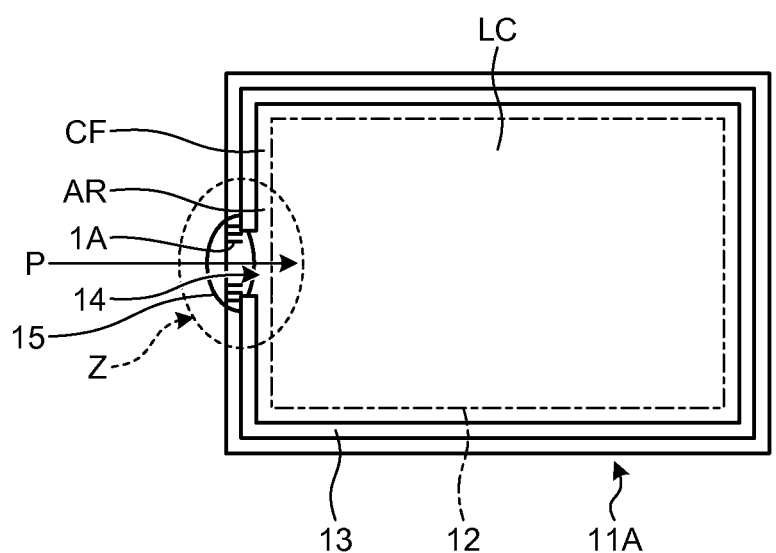
FIG. 1 is a plan view illustrating a liquid crystal display device according to a first embodiment.
Figure 2:
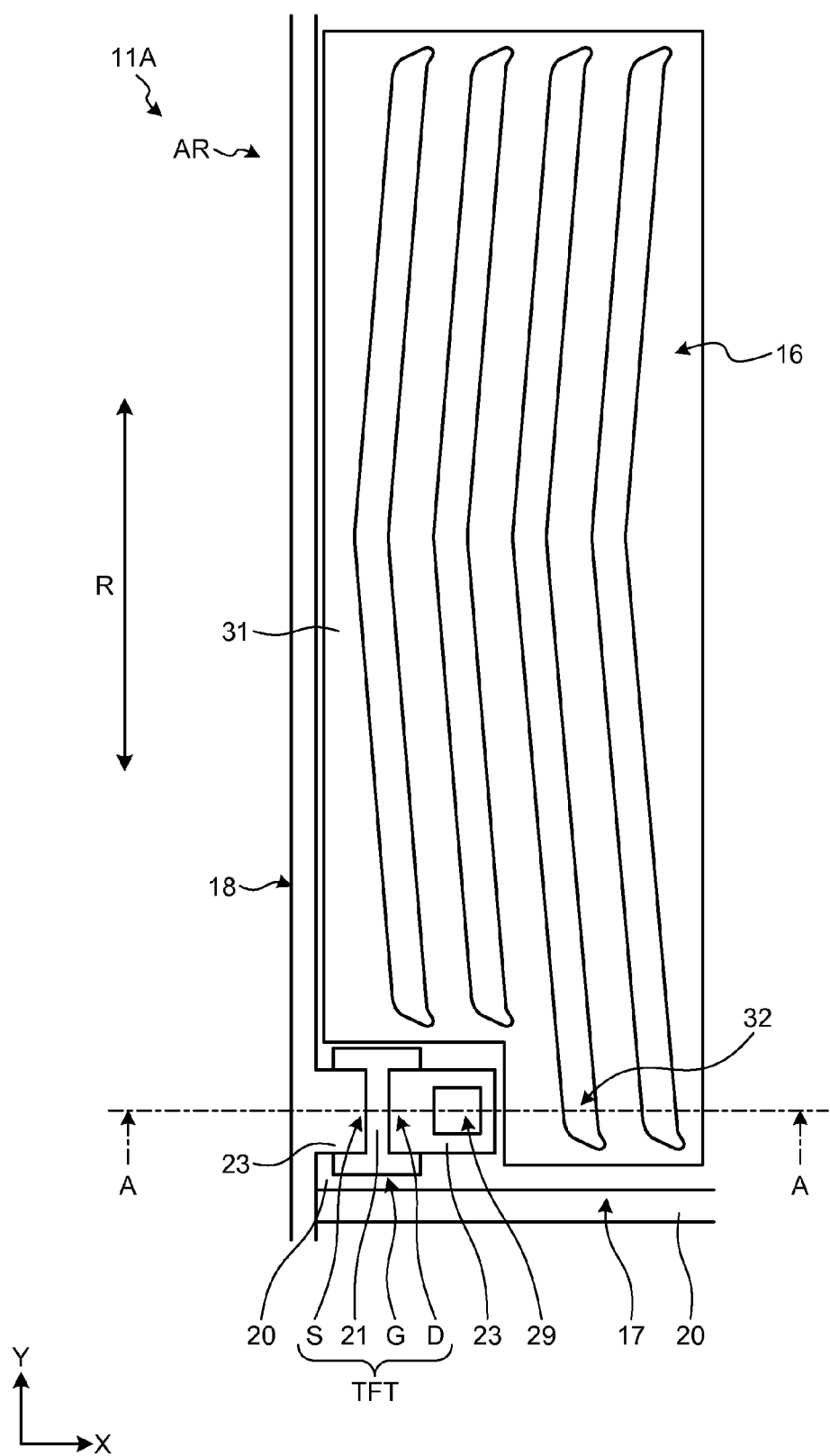
FIG. 2 is a plan view illustrating one subpixel in the liquid crystal display device according to the first embodiment.
Figure 3:
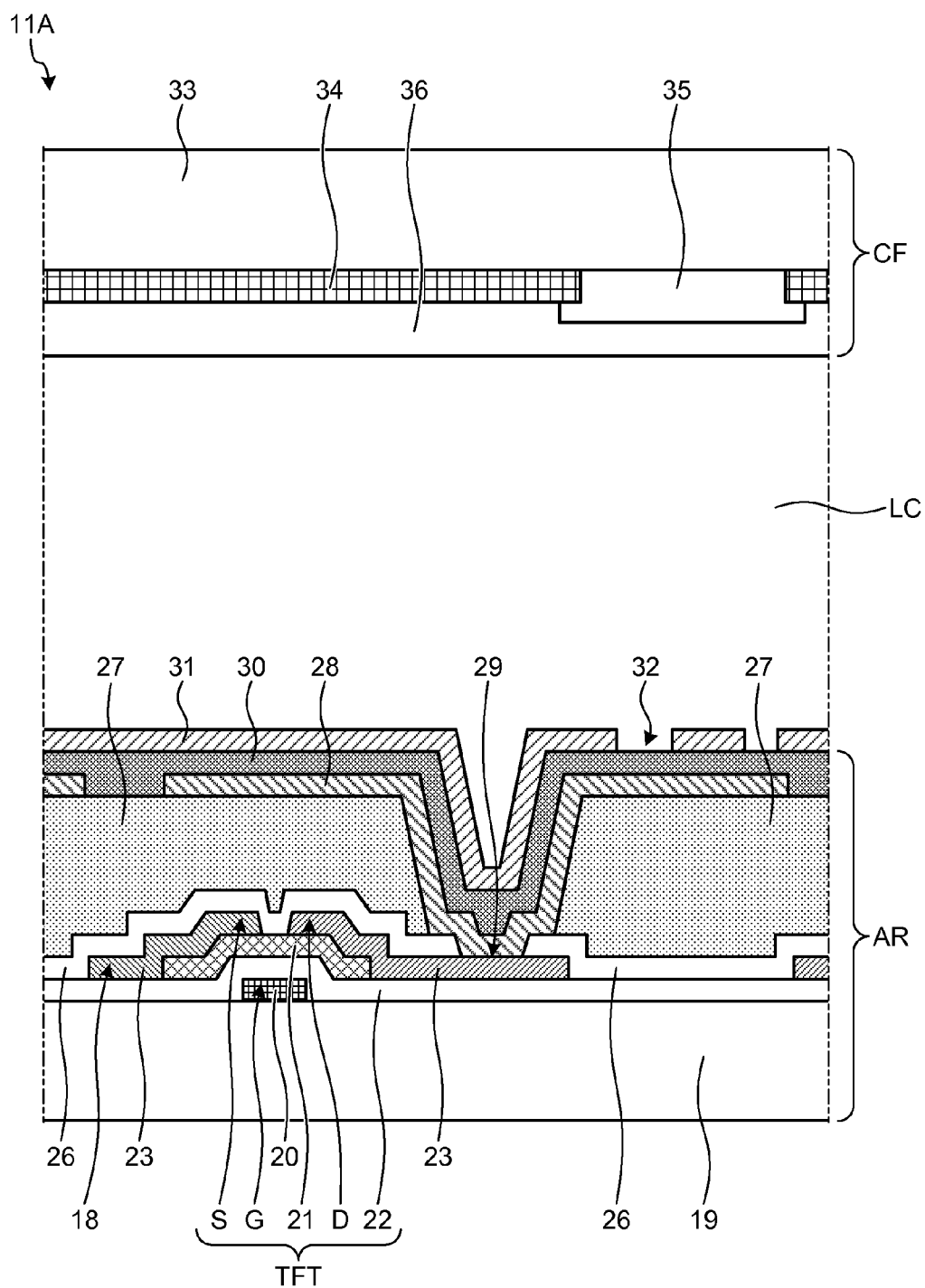
FIG. 3 is a cross-sectional view taken on line A-A in FIG. 2.
Figure 6:
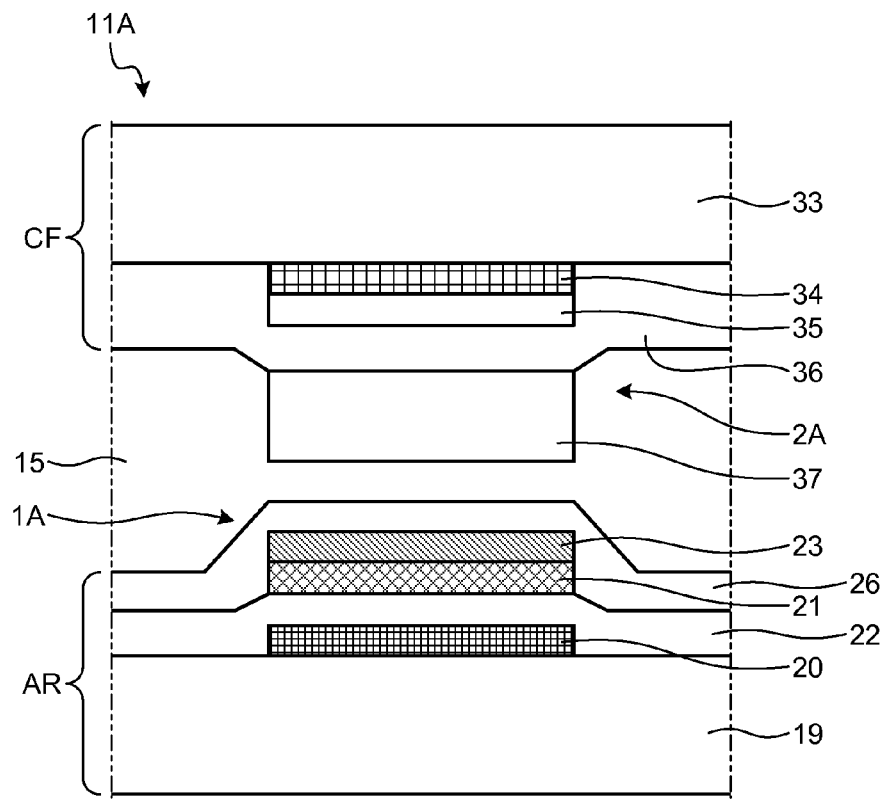
FIG. 6 is a cross-sectional view taken on line B-B in FIGS. 4 and 5.
Figure 7:
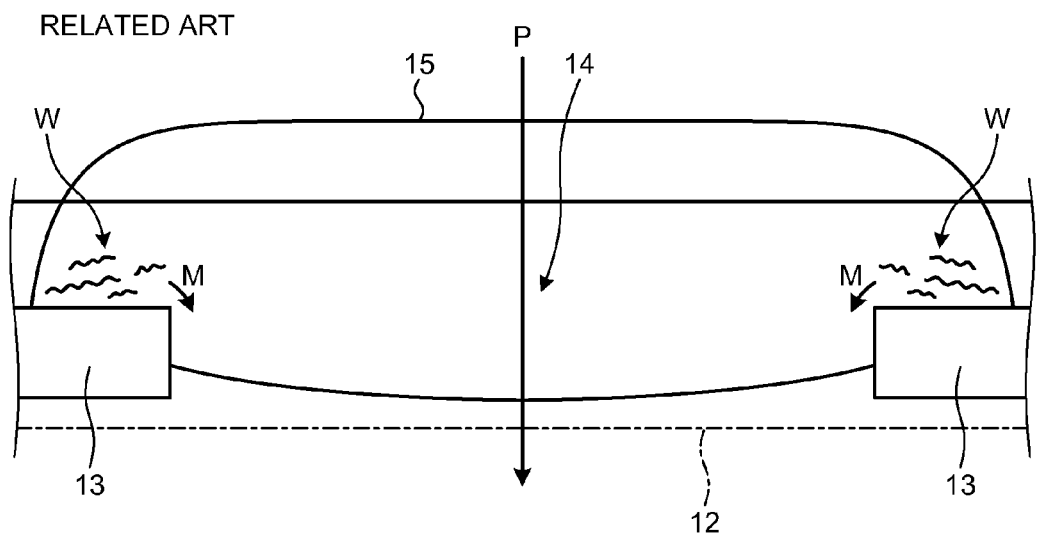
FIG. 7 is a schematic diagram illustrating creases generated in a filling material.

Described first is the configuration of the liquid crystal display device according to the first embodiment. FIG. 1 is a plan view illustrating the liquid crystal display device according to the first embodiment. FIG. 2 is a plan view illustrating one subpixel in the liquid crystal display device according to the first embodiment. The bidirectional arrow R in FIG. 2 indicates the rubbing direction. FIG. 3 is a cross-sectional view taken on line A-A in FIG. 2. FIG. 4 is a plan view illustrating a first protrusion. FIG. 4 illustrates a part indicated by the arrow Z in FIG. 1. The arrow P in FIG. 4 indicates the injection direction of the liquid crystal. FIG. 5 is a plan view illustrating a second protrusion. The arrow P in FIG. 5 indicates the injection direction of the liquid crystal. FIG. 6 is a cross-sectional view taken on line B-B in FIGS. 4 and 5. FIG. 7 is a schematic diagram illustrating creases generated in the filling material.

In the liquid crystal display device 11A, an array substrate AR and a color filter substrate CF are arranged to face each other. In the liquid crystal display device 11A, a seal material 13 is disposed between the array substrate AR and the color filter substrate CF for bonding the array substrate AR and the color filter substrate CF. The seal material 13 is disposed so as to surround a display area 12 serving as an area for displaying images. In the liquid crystal display device 11A, a liquid crystal is injected into the space surrounded by the array substrate AR, the color filter substrate CF, and the seal material 13. A liquid crystal injection inlet 14 is an opening for injecting the liquid crystal into the liquid crystal display device 11A and provided on the seal material 13 of the liquid crystal display device 11A. The liquid crystal injection inlet 14 is sealed by a filling material 15.

In the liquid crystal display device 11A, as illustrated in FIG. 1, a liquid crystal is injected into the liquid crystal display device from the liquid crystal injection inlet 14 in the direction indicated by the arrow P. After the liquid crystal is injected, the filling material 15 is filled in the liquid crystal injection inlet 14 of the liquid crystal display device 11A. In the liquid crystal display device 11A, therefore, the injected liquid crystal is sealed by the seal material 13, the filling material 15, the array substrate AR, and the color filter substrate CF. This makes the liquid crystal layer LC in the liquid crystal display device 11A sandwiched between the array substrate AR and the color filter substrate CF.

The following describes the layered structure of the display area 12 of the liquid crystal display device 11A with reference to FIGS. 2 and 3. The liquid crystal panel 11A has a plurality of pixels aligned in a row direction and in a column direction in the display area 12. Each pixel includes three subpixels for displaying three primary colors of Red (R), Green (G), and Blue (B), for example. The color of each pixel is determined based on a mixed color of light including the colors R, G, and B. As illustrated in FIG. 2, the subpixel 16 in the array substrate AR includes a scanning line 17, a signal line 18, and a thin film transistor TFT. The scanning line 17 is made of, for example, an opaque metal such as aluminum or molybdenum, and extends in the X-axis direction. The signal line 18 is made of, for example, an opaque metal such as aluminum or molybdenum, and extends in the Y-axis direction. Also, the thin film transistor TFT is disposed near an intersection portion between the scanning line 17 and the signal line 18.

As illustrated in FIGS. 2 and 3, the array substrate AR has a first transparent substrate 19 as a base, made of glass, quartz, a plastic material, or the like, which is transparent and has an insulating property. The scanning line 17 is formed on a surface of the first transparent substrate 19. A gate electrode G is provided extending from the scanning line 17. The scanning line 17 and the gate electrode G are each made of an opaque metal such as aluminum and molybdenum (hereinafter, referred to as a first metallic layer 20).

On a surface of the first metallic layer 20, a transparent gate insulating layer 22 made of silicon nitride, silicon oxide, or the like is laminated so as to cover the first metallic layer 20. On a portion of a surface of the gate insulating layer 22 which overlaps with the gate electrode G in planar view, a semiconductor layer 21 made of a-Si is formed. On a surface of the gate insulating layer 22, a plurality of signal lines 18 made of a metal such as aluminum or molybdenum are also formed. A source electrode S is provided extending from the signal line 18 and partially contacts a surface of the semiconductor layer 21.

On a surface of the gate insulating layer 22, a drain electrode D formed at the same time with the same material as the signal line 18 and the source electrode S is also provided. The drain electrode D is disposed near the source electrode S and partially contacts a surface of the semiconductor layer 21. That is, the signal line 18, the source electrode S, and the drain electrode D are made of an opaque metal such as aluminum or molybdenum (hereinafter, referred to as a second metallic layer 23). The gate electrode G, the gate insulating layer 22, the semiconductor layer 21, the source electrode S, and the drain electrode D constitute the thin film transistor TFT serving as a switching element, which is provided in each subpixel 16.

On a surface of the second metallic layer 23 and the gate insulating layer 22, a transparent passivation layer 26 made of silicon nitride, silicon oxide, or the like is laminated so as to cover exposed areas of the second metallic layer 23 and the gate insulating layer 22. On a surface of the passivation layer 26, an interlayer resin layer 27 made of a photoresist material or other transparent resin materials is laminated so as to cover the passivation layer 26.

On a surface of the interlayer resin layer 27, a lower electrode 28 made of a transparent conductive material such as an indium tin oxide (ITO) or an indium zinc oxide (IZO) is formed so as to cover the interlayer resin layer 27. A contact hole 29 for a pixel electrode is formed so as to extend completely through both the interlayer resin layer 27 and the passivation layer 26 to reach the drain electrode D. The lower electrode 28 and the drain electrode D are electrically coupled to each other through the contact hole 29. This enables the lower electrode 28 to operate as a pixel electrode.

On a surface of the lower electrode 28, a transparent inorganic insulating layer 30 made of silicon nitride, silicon oxide, or the like is laminated so as to cover the lower electrode 28. On a surface of the inorganic insulating layer 30, an upper electrode 31 made of a transparent conductive material such as an ITO or an IZO is formed so as to cover the inorganic insulating layer 30. The upper electrode 31 is coupled to a common wiring (not illustrated) in the peripheral of the display area 12, and thus operates as a common electrode.

A plurality of slit openings 32 are formed in the upper electrode 31. On a surface of the upper electrode 31, a first orientation layer (not illustrated) made of, for example, polyimide is laminated so as to cover the upper electrode 31. The first orientation layer is subjected to a liquid crystal direction alignment treatment, that is, a rubbing treatment in the Y-axis direction (in the direction approximately parallel with the extending direction of the signal line 18) of FIG. 2.

A plurality of V-shaped openings 32 each extending in the extending direction of the signal line 18 are formed at equal intervals in the upper electrode 31 (refer to FIG. 2). Because the subpixel 16 is vertically long, when the openings 32 are made to transversely extend, the number of both ends of the openings 32 increases. The end portions of the openings 32 are the area of irregular orientation of the liquid crystal molecules. Then, in the liquid crystal display device 11A according to the first embodiment, as illustrated in FIG. 2, the extending direction of the opening 32 is set as the Y-axis direction, whereby the number of end portions of the openings 32 is reduced and a decrease in aperture ratio is reduced.

The extending directions of the openings 32 are inclined at about +5° and at about −5° with respect to the rubbing direction. If all the openings 32 are inclined either in a clockwise direction or in a counterclockwise direction with respect to the rubbing direction, a phenomenon appears such that the color changes depending on viewing angle directions because the liquid crystal molecules are twisted in one direction. This is because an apparent retardation changes depending on the direction along which the liquid crystal molecules are seen. In order to suppress the phenomenon due to the change of the retardation, two domains are provided in the liquid crystal display panel 11A according to the first embodiment: a domain in which the extending direction of the opening 32 is inclined at about +5° with respect to the clockwise direction; and a domain in which the extending direction of the opening 32 is inclined at about −5° with respect to the clockwise direction.

The color filter substrate CF has a second transparent substrate 33 made of glass, quartz, a plastic material, or the like as a base, which is transparent and has an insulating property. On a surface of the second transparent substrate 33, a black matrix layer 34 made of a resin having a light blocking property is formed in a position facing the scanning line 17, the signal line 18, and the thin film transistor TFT. Also on a surface of the second transparent substrate 33, color filter layers 35 are formed. The color filter layers 35 each transmit one of lights of different colors (e.g., R, G, and B) or a clear light for each of the subpixels 16.

An overcoat layer (protection layer) 36 made of, for example, a transparent resin material such as a photoresist material is laminated so as to cover the black matrix layer 34 and the color filter layer 35. The overcoat layer 36 in the subpixel 16 is formed for the purpose of planarizing stepped portions due to the color filter layers 35 having the different colors, and blocking impurities flowing out of the black matrix layer 34 or the color filter layer 35 so that the impurities do not enter the liquid crystal layer LC. On a surface of the overcoat layer 36, a second orientation layer (not illustrated) made of, for example, polyimide is formed so as to cover the overcoat layer 36. The second orientation layer is subjected to rubbing treatment in the opposite direction to that for the first orientation layer.

With the structure described above, when the thin film transistor TFT is turned ON in the subpixel 16, an electric field is generated between the lower electrode 28 and the upper electrode 31, and thus the orientation of the liquid crystal molecules in the liquid crystal layer LC is changed. As a result, a light transmittance of the liquid crystal layer LC is changed, and thus the liquid crystal display panel 11A displays thereon an image in the FFS mode. In addition, an area in which the lower electrode 28 and the upper electrode 31 face each other with the inorganic insulating layer 30 interposed therebetween forms a subsidiary capacitor. The subsidiary capacitor thus formed holds the electric field generated between the lower electrode 28 and the upper electrode 31 for a predetermined period of time after the thin film transistor TFT is turned OFF.

The following describes the configuration of the periphery of the liquid crystal injection inlet 14. In the liquid crystal display device 11A, as illustrated in FIG. 4, near each of the sides of the liquid crystal injection inlet 14, three protrusions (hereinafter, each referred to as a first protrusion 1A) are disposed on the array substrate AR. In other words, near each of end portions 13a of the seal material 13, three first protrusions 1A are provided on the array substrate AR. The first protrusions 1A are provided outside of an area surrounded by the seal material 13. The first protrusions 1A each protruding toward the color filter substrate CF with its long side along the injection direction of the liquid crystal are arrayed side by side in the direction perpendicular to the injection direction of the liquid crystal. The injection direction of the liquid crystal is a direction perpendicular to the line connecting both the end portions of the liquid crystal injection inlet 14. In the first embodiment, an exemplary structure is described, in which a group of three first protrusions 1A is each disposed near both sides of the liquid crystal injection inlet 14, however, the number of first protrusions 1A in the group is not limited to three. The number of first protrusion 1A in the group may be one, two, or four or more.

As illustrated in FIG. 5, protrusions (hereinafter, each referred to as a second protrusion 2A) are disposed on the color filter substrate CF so as to face the first protrusions 1A formed on the array substrate AR, respectively. The second protrusions 2A each protruding toward the array substrate AR have a shape corresponding to the first protrusions 1A.

The following describes the configuration of the first protrusion 1A and the second protrusion 2A with reference to FIG. 6. As illustrated in FIG. 6, the following are laminated in the first protrusion 1A: the first metallic layer 20 forming the gate electrode G in the display area 12; the gate insulating layer 22; the semiconductor layer 21; the second metallic layer 23 forming the source electrode S and the drain electrode D in the display area 12; and the passivation layer 26. In the second protrusion 2A, the black matrix layer 34, the color filter layer 35, the overcoat layer 36, and the spacer 37 are laminated.

If the frame of the liquid crystal display device 11A has a narrower width, the seal material 13 cannot obtain enough space for forming its folded part. If no folded part is formed in the liquid crystal injection inlet 14, as illustrated in FIG. 7, creases W generated in the filling material 15 progress toward the display area 12 as indicated by the arrow M, whereby bubbles may enter the display area 12.

By contrast, in the liquid crystal display device 11A, the first protrusion 1A and the second protrusion 2A are provided so as to prevent the filling material 15 from moving in the direction perpendicular to the injection direction of the liquid crystal during the manufacture of the liquid crystal display device, thereby suppressing the progress of the creases W. This makes the liquid crystal display device 11A in which the progress of the creases W is suppressed, thereby preventing the bubbles generated due to the creases from entering the display area 12. With this structure in the liquid crystal display device 11A, the progress of the creases W can be suppressed without providing any folded part on the seal material 13, thereby narrowing the outside space of the seal material 13 in the frame of the liquid crystal display device 11A. This downsizes the external dimensions of the liquid crystal display panel, therefore, a higher number of liquid crystal display panels can be manufactured from a mother substrate during the manufacture of the liquid crystal display device.

In the liquid crystal display device 11A, the first protrusion 1A and the second protrusion 2A are provided by laminating the layers the same as those for forming the display area 12 on the areas where the first protrusion 1A and the second protrusion 2A are formed. This can provide the first protrusion 1A and the second protrusion 2A without any additional process. In the liquid crystal display device 11A, the first protrusion 1A is formed by laminating the first metallic layer 20, the gate insulating layer 22, the semiconductor layer 21, the second metallic layer 23, and the passivation layer 26. This can preferably form the first protrusion 1A without increasing the number of processes for manufacturing a liquid crystal display device even if no overcoat layer 36 is provided. In addition, in the liquid crystal display device 11A, the first protrusion 1A includes the first metallic layer 20 and the second metallic layer 23, thereby having a higher first protrusion 1A. This can narrow the space between the array substrate AR and the color filter substrate CF formed by the first protrusion 1A and the second protrusion 2A.

In the liquid crystal display device 11A according to the present embodiment, the second protrusion 2A has substantially an equal width to that of the first protrusion 1A. This width means the length of the short side viewed from the upper surface, that is, the length in the direction perpendicular to the injection direction of the liquid crystal. As described above, when the first protrusion 1A and the second protrusion 2A have an equal width to each other, the area where the space between the side of the array substrate AR and the side of the color filter substrate CF is narrowed by the first protrusion 1A and the second protrusion 2A, can be made the widest for the formed first protrusion 1A. This efficiently uses the space for forming the first protrusion 1A and the second protrusion 2A in the direction perpendicular to the injection direction of the liquid crystal.

Method for Manufacturing the Liquid Crystal Display Device

Figure 8:
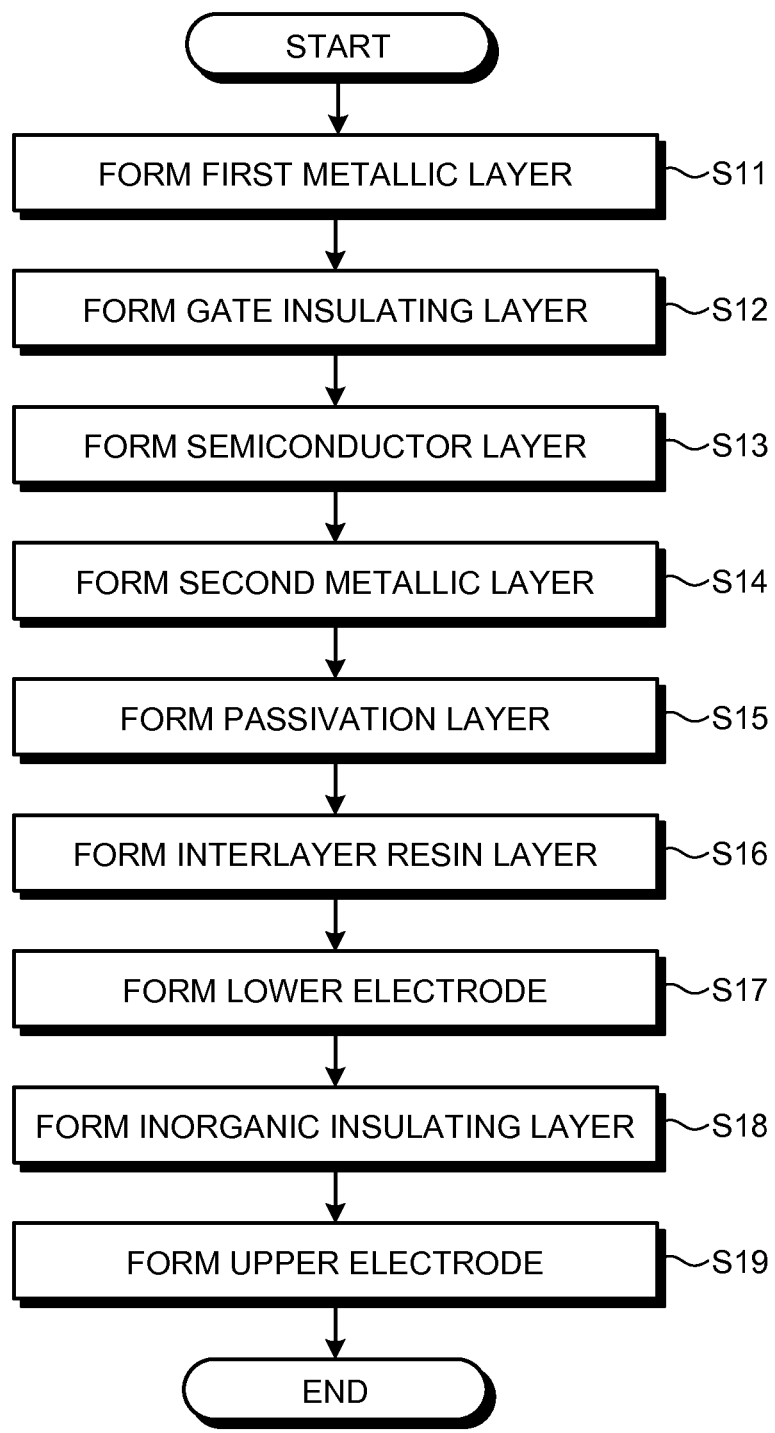
FIG. 8 is a flowchart of an example of a method for manufacturing an array substrate.

The following describes a method for manufacturing the liquid crystal display device according to the first embodiment. FIG. 8 is a flowchart of an example of a method for manufacturing the array substrate according to the first embodiment. As illustrated in FIG. 8, in the method for manufacturing the liquid crystal display device, the first metallic layer 20 forming the gate electrode G is provided on a surface of the first transparent substrate 19 (Step S11). On this occasion, in the method for manufacturing the liquid crystal display device, the first metallic layer 20 is also formed on the area where the first protrusion 1A is formed. Subsequently, in the method for manufacturing the liquid crystal display device, the gate insulating layer 22 is formed on a surface of the first transparent substrate 19 and the first metallic layer 20 (Step S12). On this occasion, the gate insulating layer 22 is also formed on the area where the first protrusion 1A is formed. The semiconductor layer 21 is then formed on a surface of the gate insulating layer 22 (Step S13). On this occasion, the semiconductor layer 21 is also formed on the area where the first protrusion 1A is formed. Subsequently, the second metallic layer 23 is formed on a surface of the semiconductor layer 21 and the gate insulating layer 22 (Step S14). On this occasion, the second metallic layer 23 is also formed on the area where the first protrusion 1A is formed. The passivation layer 26 is formed on a surface of the semiconductor layer 21 and the second metallic layer 23 (Step S15). On this occasion, the passivation layer 26 is also formed on the area where the first protrusion 1A is formed. The interlayer resin layer 27 is then formed on a surface of the passivation layer 26 (Step S16). Subsequently, the lower electrode 28 is formed on a surface of the second metallic layer 23, the passivation layer 26, and the interlayer resin layer 27 (Step S17). After that, the inorganic insulating layer 30 is formed on a surface of the interlayer resin layer 27 and the lower electrode 28 (Step S18). Finally, the upper electrode 31 is formed on a surface of the inorganic insulating layer 30 (Step S19).

Figure 9:
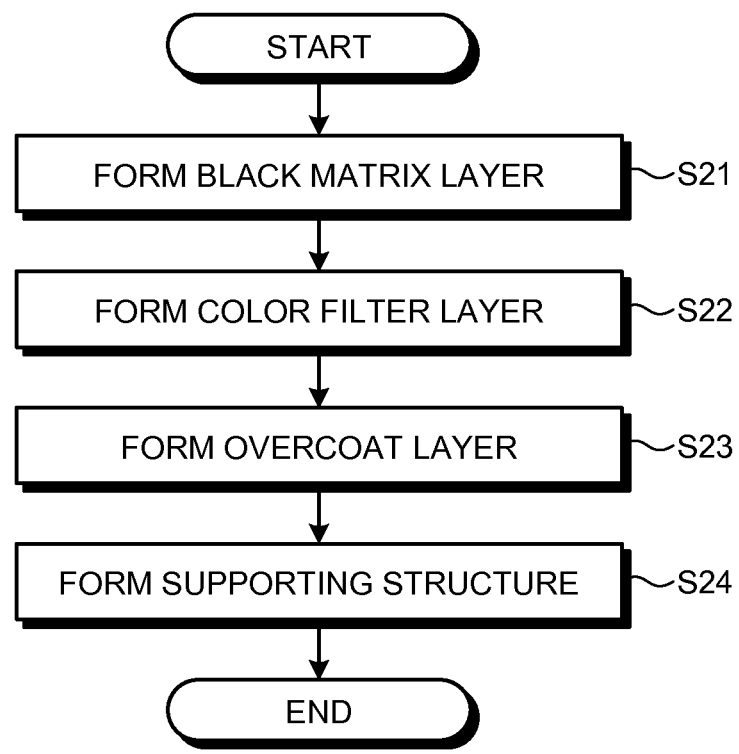
FIG. 9 is a flowchart of an example of a method for manufacturing a color filter substrate.

FIG. 9 is a flowchart of an example of a method for manufacturing the color filter substrate according to the first embodiment. As illustrated in FIG. 9, the black matrix layer 34 is firstly formed on a surface of the second transparent substrate 33 (Step S21). On this occasion, the black matrix layer 34 is also formed on the area where the second protrusion 2A is formed. Subsequently, the color filter layer 35 is formed on a surface of the second transparent substrate 33 and the black matrix layer 34 (Step S22). On this occasion, the color filter layer 35 is also formed on the area where the second protrusion 2A is formed. The overcoat layer 36 is then formed on a surface of the black matrix layer 34 and the color filter layer 35 (Step S23). On this occasion, the overcoat layer 36 is also formed on the area where the second protrusion 2A is formed. Finally, a supporting structure is formed on a surface of the overcoat layer 36 (Step S24).

Figure 10:
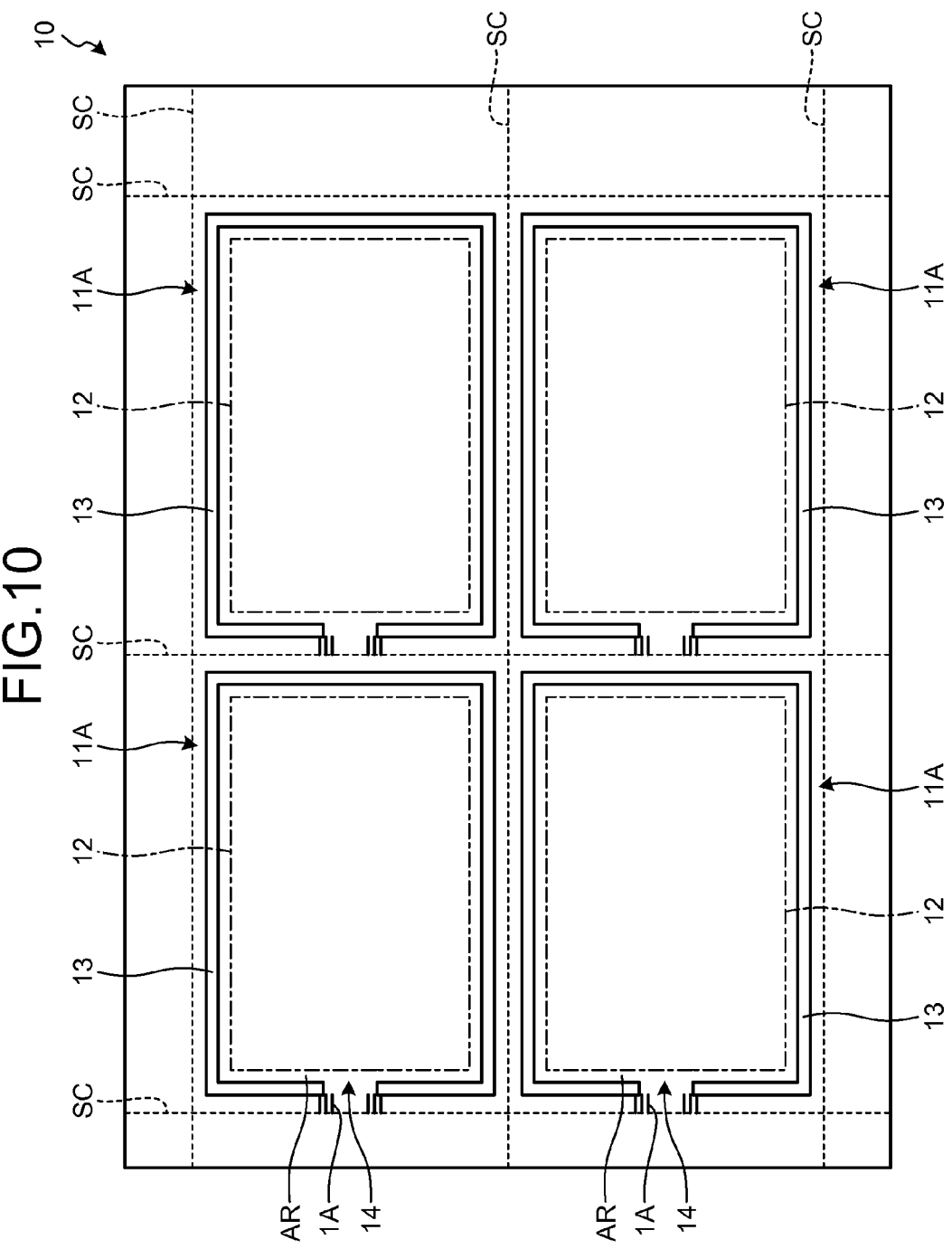
FIG. 10 is a plan view illustrating array substrates in a mother substrate before being cut-off into the liquid crystal display devices according to the first embodiment.

FIG. 10 is a plan view illustrating the array substrates in a mother substrate before being cut-off into the liquid crystal display devices according to the first embodiment. In the method for manufacturing the liquid crystal display device according to the present embodiment, the array substrates AR for a plurality of liquid crystal display devices 11A are formed from a piece of mother substrate 10 through the processes illustrated in FIG. 8, and the color filter substrates CF for a plurality of liquid crystal display devices 11A are formed from a piece of mother substrate 10 through the processes illustrated in FIG. 9. Subsequently, the manufactured mother substrate 10 of the array substrates AR and the mother substrate of the color filter substrates CF (not illustrated) are bonded to each other with the seal material 13 interposed therebetween.

As a result, as illustrated in FIG. 10, one laminated mother substrate 10 is provided from which four (two in length×two in width) liquid crystal display devices 11A can be obtained. In the first embodiment, four liquid crystal devices 11A are manufactured from one mother substrate 10; however, the description is provided merely for exemplary purpose for easy understanding and the liquid crystal devices are not limited to this number. Actually, a greater number of liquid crystal display devices 11A can be manufactured at the same time.

In the method for manufacturing the liquid crystal display device, a wheel cutter is moved along scribe lines SC illustrated in FIG. 10 to form a groove, and stress is applied to the mother substrate 10, thereby cutting the mother substrate 10. As a result, laminated bodies in which the array substrate AR and the color filter substrate CF are bonded to each other by the seal material 13 is obtained for one liquid crystal display device 11A. After that, a liquid crystal is injected from the liquid crystal injection inlet 14 that is an opening part of the seal material 13 and the liquid crystal injection inlet 14 is sealed by the filling material 15, thereby manufacturing the liquid crystal display device 11A (a liquid crystal panel). The liquid crystal display device 11A can be manufactured by coupling to a control device, laminating a back light layer, and/or housing the liquid crystal display device 11A as necessary in addition to the above-described processes.

As described above, in a method for manufacturing the liquid crystal display device 11A according to the first embodiment, the first protrusion 1A is formed in the laminating process of the array substrate AR and the second protrusion 2A is formed in the laminating process of the color filter substrate CF. This eliminates an additional process for forming the first protrusion 1A after the laminating process of the array substrate AR and an additional process for forming the second protrusion 2A after the laminating process of the color filter substrate CF. This prevents any change or other influences on the processes after the laminating process of the array substrate AR and the laminating process of the color filter substrate CF if the first protrusion 1A and the second protrusion 2A are provided. The structure in the embodiment has no folded part of the seal material 13, thereby making the position of the scribe lines SC closer to the display area 12. As a result, a greater number of liquid crystal display devices 11A can be manufactured from a single mother substrate 10.

Modification of the First Embodiment

Figure 11:
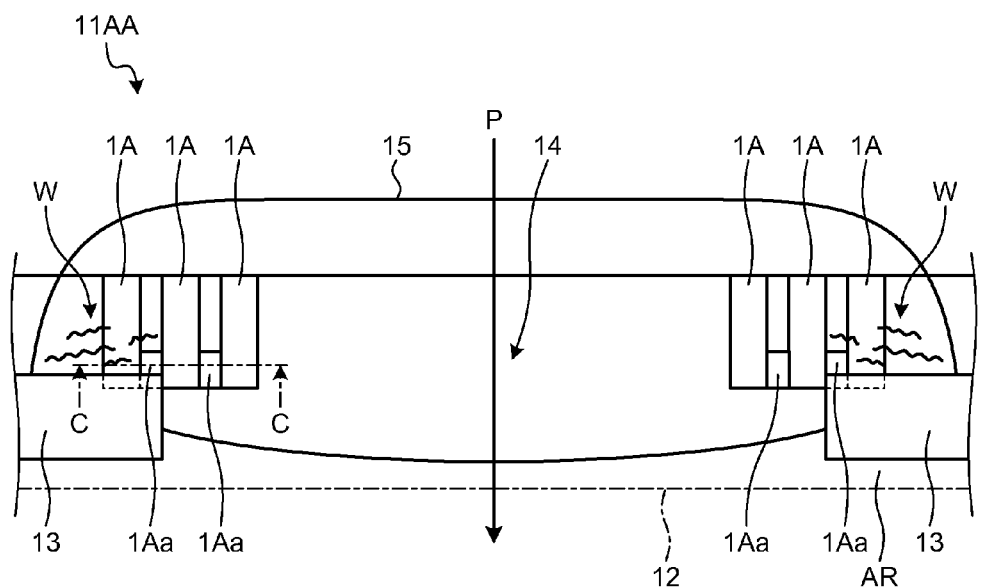
FIG. 11 is a plan view illustrating a modification of the liquid crystal display device according to the first embodiment.
Figure 12:
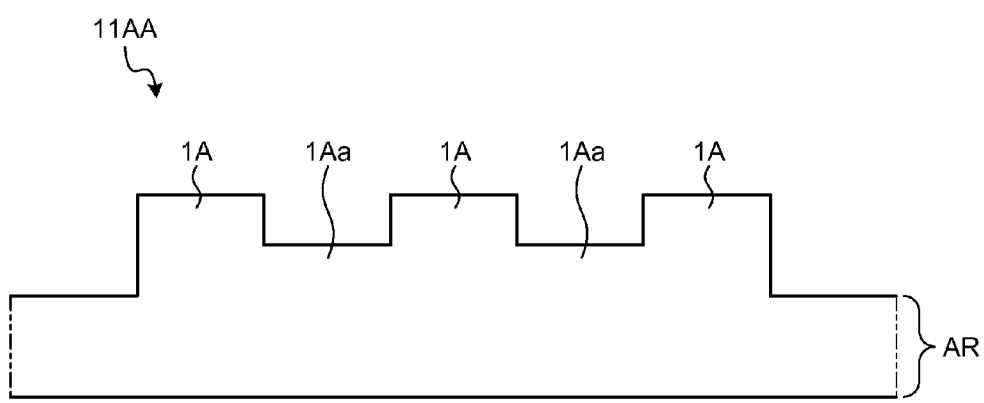
FIG. 12 is a cross-sectional view taken on line C-C in FIG. 11.

FIG. 11 is a plan view illustrating a modification of the liquid crystal display device according to the first embodiment. FIG. 12 is a cross-sectional view taken on line C-C in FIG. 11. In a liquid crystal display device 11AA according to a modification of the first embodiment, as illustrated in FIG. 11, connecting parts 1Aa are formed in addition to the three first protrusions 1A formed in the liquid crystal display device 11A according to the first embodiment. The connecting part 1Aa connects the first protrusions 1A provided on the side of the array substrate AR. The connecting part 1Aa is provided in an end portion of the first protrusion 1A in the injection direction of the liquid crystal. As illustrated in FIG. 12, the connecting part 1Aa is formed so as to fill the space between the first protrusions 1A adjacent to each other on the inner end portion of the first protrusion 1A in the injection direction of the liquid crystal. The connecting part 1Aa is formed so as to be higher than a part where only the gate insulating layer 22 and the passivation layer 26 are formed on the first transparent substrate 19 of the array substrate AR (refer to FIG. 6). That is, the connecting part 1Aa may be formed having an equal height as that of the first protrusion 1A. The connecting part 1Aa is formed at the same time as other part(s) in the laminating process on the array substrate AR in the same manner as the first protrusion 1A. The connecting part 1Aa may include the first metallic layer 20, the semiconductor layer 21, and the second metallic layer 23, in the same manner as the first protrusion 1A. The connecting part 1Aa may not include the first metallic layer 20 and/or the second metallic layer 23. Connecting parts (not illustrated) for connecting the second protrusions 2A are formed on the side of the color filter substrate CF, in the same manner as connecting parts 1Aa provided on the side of the array substrate AR.

With the structure of the liquid crystal display device 11AA according to the modification of the first embodiment, if the crease W overrides the first protrusions 1A in the direction perpendicular to the injection direction of the liquid crystal, the connecting part 1Aa stops the progress of the crease W in the injection direction of the liquid crystal. This suppresses the progress of the crease W into the side of the display area 12. The structure of the liquid crystal display device 11AA according to the modification of the first embodiment, therefore, can prevent the filling material 15 from moving in the injection direction of the liquid crystal. This suppresses more surely the progress of the crease W (refer to FIG. 11) into the side of the display area 12, thereby preventing bubbles from entering the display area 12.

1-2. Second Embodiment

The following describes a liquid crystal display device according to a second embodiment. In the description below, components similar to the components that have already been described are designated by the same reference numerals as those of the components that have already been described, and overlapped explanations thereof will not be repeated. FIG. 13 is a cross-sectional view of the first and second protrusions in a liquid crystal display device according to a second embodiment. FIG. 13 illustrates a cross-sectional view on the position corresponding to the cross-section taken on line B-B in FIGS. 4 and 5. As illustrated in FIG. 13, the first protrusion 1B includes the gate insulating layer 22, the semiconductor layer 21, and the passivation layer 26. The second protrusion 2B includes the black matrix layer 34, the color filter layer 35, the overcoat layer 36, and the spacer 37 all provided on the second transparent substrate 33.

As described above, the first protrusion 1B in a liquid crystal display device 11B according to the second embodiment includes no metallic layer. This eliminates generation of pieces of metallic layer when the mother substrate 10 is cut along the scribe lines SC illustrated in FIG. 10. This therefore prevents pieces of metallic layer from mixing in as a foreign material on the side of the display area 12. If the first protrusion 1B includes any metallic layer, the mother substrate 10 may be harder to be cut along the scribe lines SC illustrated in FIG. 10 due to the metallic layer. The first protrusion 1B in the liquid crystal display device 11B according to the second embodiment, however, includes no metallic layer, thus the mother substrate 10 can be readily cut along the scribe lines SC illustrated in FIG. 10.

The first protrusion 1B according to the second embodiment and the first protrusion 1A according to the first embodiment may be alternately provided in the direction perpendicular to the injection direction of the liquid crystal. In this modification, the first protrusions 1A and 1B and the second protrusions 2A and 2B form a wide area and a narrow area between the array substrate AR and the color filter substrate CF. With this structure, the filling material 15 repeatedly shrinks and expands when moving in the direction perpendicular to the injection direction of the liquid crystal, resulting in generating resistance that prevents the filling material 15 from moving. The structure of the modification of the liquid crystal display device 11B according to the second embodiment can therefore prevent the filling material 15 from moving in the direction perpendicular to the injection direction of the liquid crystal. Accordingly, the progress of the creases W can be further suppressed, thereby preventing bubbles from entering the display area 12.

1-3. Third Embodiment

The following describes a liquid crystal display device according to a third embodiment. In the description below, components similar to the components that have already been described in the first and second embodiments are designated by the same reference numerals as those of the components that have already been described, and overlapped explanations thereof will not be repeated. FIG. 14 is a cross-sectional view of first and second protrusions in a liquid crystal display device according to a third embodiment. FIG. 14 illustrates a cross-sectional view on the position corresponding to the cross-section taken on line B-B in FIGS. 4 and 5. As illustrated in FIG. 14, the first protrusion 1C includes the gate insulating layer 22, the semiconductor layer 21, and the passivation layer 26. The second protrusion 2C includes the black matrix layer 34, the color filter layer 35, the overcoat layer 36, and the spacer 37 all provided on the second transparent substrate 33.

In a liquid crystal display device 11C according to the third embodiment, a recessed portion 3 is formed on a position where the passivation layer 26 faces the spacer 37 so as to expose the semiconductor layer 21. That is, the first protrusion 1C has the recessed portion 3 formed on a surface facing the second protrusion 2C. The recessed portion 3 is formed in the laminating process of the array substrate AR, by eliminating a part of the passivation layer 26 using dry etching or any other process through patterning for forming the passivation layer 26 in the display area 12. FIG. 14 illustrates an example in which the recessed portion 3 is formed by eliminating the passivation layer 26 to the full depth on the semiconductor layer 21. The recessed portion 3 may be formed by eliminating the passivation layer 26 to the middle depth so as to leave the passivation layer 26 to some extent on the semiconductor layer 21.

As described above, in the liquid crystal display device 11C according to the third embodiment, a pair of the first protrusion 1C and the second protrusion 2C forms a wide area and a narrow area between the array substrate AR and the color filter substrate CF. With this structure, the filling material 15 repeatedly shrinks and expands when moving in the direction perpendicular to the injection direction of the liquid crystal, resulting in generation of resistance that prevents the filling material 15 from moving. The structure of the liquid crystal display device 11C according to the third embodiment can therefore prevent the filling material 15 from moving in the direction perpendicular to the injection direction of the liquid crystal. Accordingly, the progress of the creases W can be further suppressed, thereby preventing bubbles from entering the display area 12.

While certain embodiments and modification have been described, these embodiments and modification have been presented by way of example only, and are not intended to limit the scope of the invention. These embodiments and modification may also be achieved in a variety of other forms.

2. Application Examples

With reference to FIGS. 15 to 26, descriptions will be made of application examples of the liquid crystal display devices 11A, 11AA, 11B, and 11C described in the embodiments and the modification. FIGS. 15 to 26 are diagrams each illustrating an example of an electronic apparatus to which a liquid crystal display device according to one of the embodiments is applied. The liquid crystal display devices 11A, 11AA, 11B, and 11C according to the first to third embodiments and the modification can be applied to electronic apparatuses of all fields, such as television devices, digital cameras, notebook personal computers, mobile terminal devices including mobile phones, and video cameras. In other words, the liquid crystal display devices 11A, 11AA, 11B, and 11C according to the first to third embodiments and the modification can be applied to electronic apparatuses of all fields that display externally received video signals or internally generated video signals as images or video pictures.

Application Example 1

Figure 15:
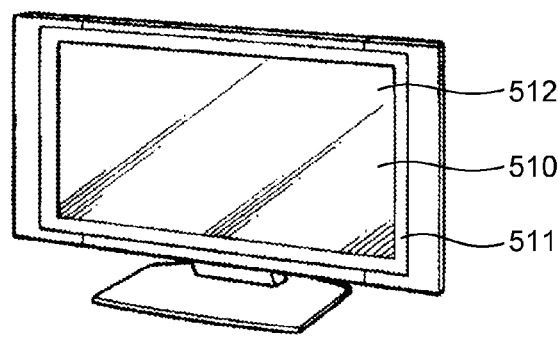
FIG. 15 is a diagram illustrating an example of an electronic apparatus to which a liquid crystal display device according to one of the embodiments is applied.

The electronic apparatus illustrated in FIG. 15 is a television device to which any one of the liquid crystal display devices 11A, 11AA, 11B, and 11C according to the first to third embodiments and the modification is applied. This television device includes, for example, a video display screen unit 510 that includes a front panel 511 and a filter glass 512. The video display screen unit 510 is any one of the liquid crystal display devices 11A, 11AA, 11B, and 11C according to the first to third embodiments and the modification.

Application Example 2

Figure 16:
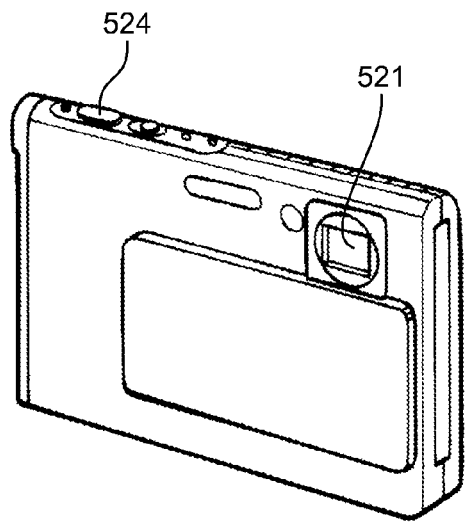
FIG. 16 is a diagram illustrating an example of an electronic apparatus to which a liquid crystal display device according to one of the embodiments is applied.
Figure 17:
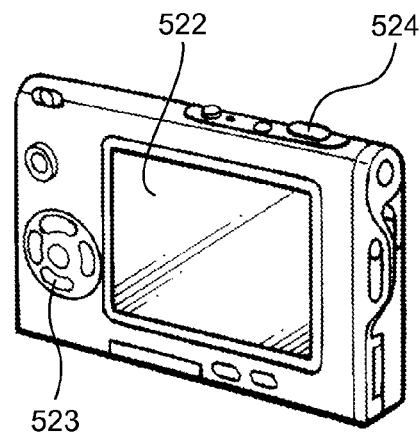
FIG. 17 is a diagram illustrating an example of an electronic apparatus to which a liquid crystal display device according to one of the embodiments is applied.

The electronic apparatus illustrated in FIGS. 16 and 17 is a digital camera to which any one of the liquid crystal display devices 11A, 11AA, 11B, and 11C according to the first to third embodiments and the modification is applied. This digital camera includes, for example, a light-emitting unit 521 for flash, a display unit 522, a menu switch 523, and a shutter button 524. The display unit 522 is any one of the liquid crystal display devices 11A, 11AA, 11B, and 11C according to the first to third embodiments and the modification.

Application Example 3

Figure 18:
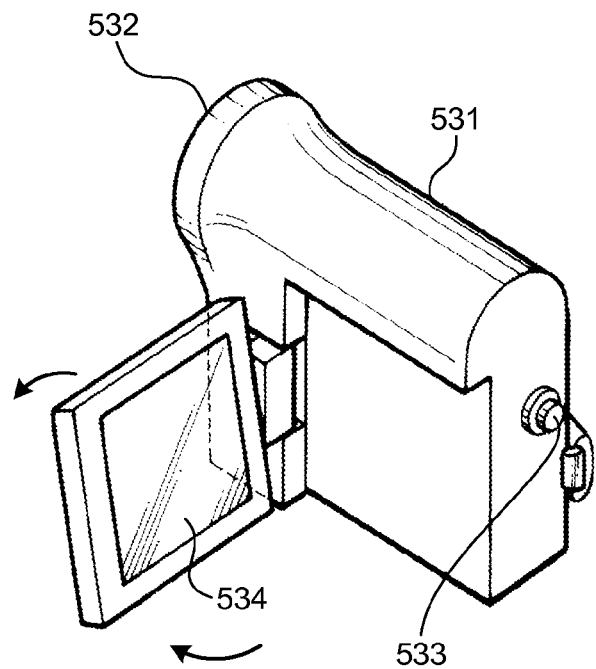
FIG. 18 is a diagram illustrating an example of an electronic apparatus to which a liquid crystal display device according to one of the embodiments is applied.

The electronic apparatus illustrated in FIG. 18 represents an external appearance of a video camera to which any one of the liquid crystal display devices 11A, 11AA, 11B, and 11C according to the first to third embodiments and the modification is applied. This video camera includes, for example, a body 531, a lens 532 provided on the front side face of the body 531 for capturing a subject, and a start/stop switch 533 and a display unit 534 that are used during shooting. The display unit 534 is any one of the liquid crystal display devices 11A, 11AA, 11B, and 11C according to the first to third embodiments and the modification.

Application Example 4

Figure 19:
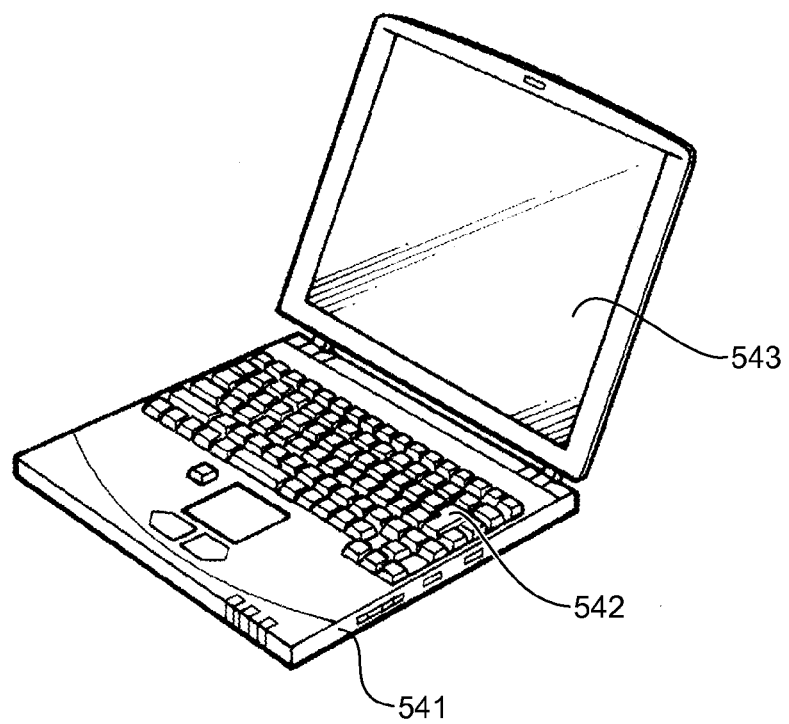
FIG. 19 is a diagram illustrating an example of an electronic apparatus to which a liquid crystal display device according to one of the embodiments is applied.
Figure 20:
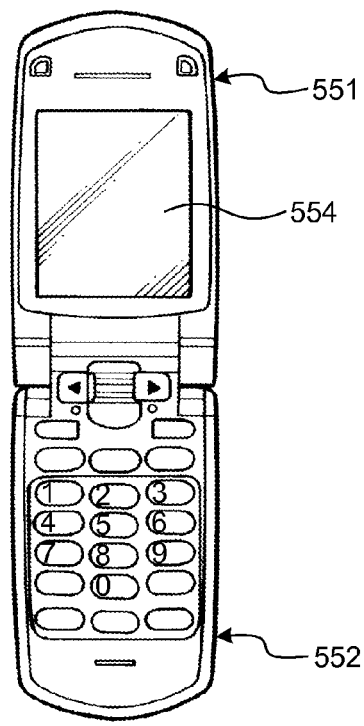
FIG. 20 is a diagram illustrating an example of an electronic apparatus to which a liquid crystal display device according to one of the embodiments is applied.
Figure 21:
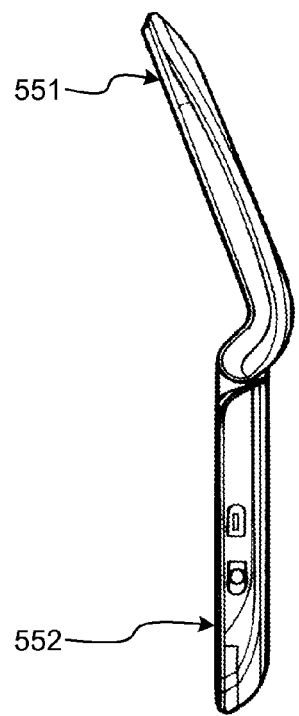
FIG. 21 is a diagram illustrating an example of an electronic apparatus to which a liquid crystal display device according to one of the embodiments is applied.
Figure 22:
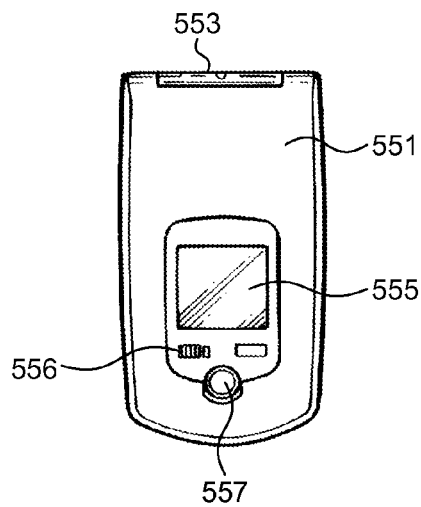
FIG. 22 is a diagram illustrating an example of an electronic apparatus to which a liquid crystal display device according to one of the embodiments is applied.
Figure 23:
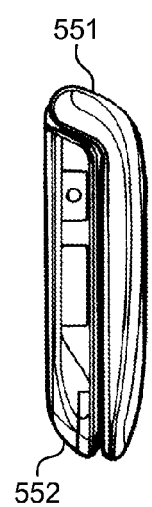
FIG. 23 is a diagram illustrating an example of an electronic apparatus to which a liquid crystal display device according to one of the embodiments is applied.
Figure 24:
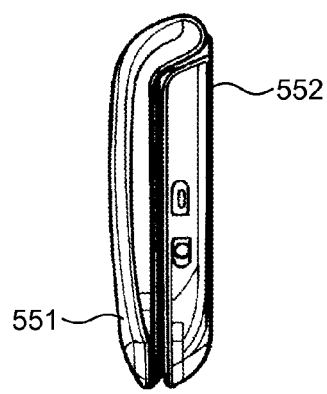
FIG. 24 is a diagram illustrating an example of an electronic apparatus to which a liquid crystal display device according to one of the embodiments is applied.
Figure 25:
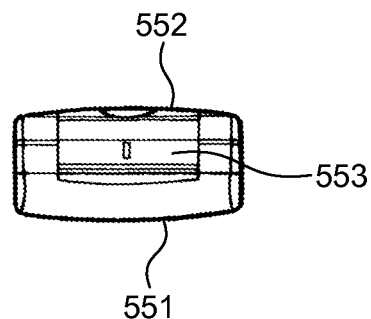
FIG. 25 is a diagram illustrating an example of an electronic apparatus to which a liquid crystal display device according to one of the embodiments is applied.
Figure 26:
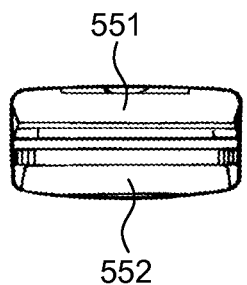
FIG. 26 is a diagram illustrating an example of an electronic apparatus to which a liquid crystal display device according to one of the embodiments is applied.

The electronic apparatus illustrated in FIG. 19 is a notebook personal computer to which any one of the liquid crystal display devices 11A, 11AA, 11B, and 11C according to the first to third embodiments and the modification is applied. This notebook personal computer includes, for example, a body 541, a keyboard 542 for input operation of characters, etc., and a display unit 543 that displays images. The display unit 543 is any one of the liquid crystal display devices 11A, 11AA, 11B, and 11C according to the first to third embodiments and the modification.

Application Example 5

The electronic apparatus illustrated in FIGS. 20 to 26 is a mobile phone to which any one of the liquid crystal display devices 11A, 11AA, 11B, and 11C according to the first to third embodiments and the modification is applied. This mobile phone includes, for example, an upper housing 551 and a lower housing 552 coupled to each other with a connection unit (hinge unit) 553, and includes a display 554, a subdisplay 555, a picture light 556, and a camera 557. The display 554 and/or the subdisplay 555 is any one of the liquid crystal display devices 11A, 11AA, 11B, and 11C according to the first to third embodiments and the modification.

3. Aspects of Present Disclosure

The present disclosure includes aspects as follows.

(1) A liquid crystal display device comprising:
a first substrate on which a metallic layer and an insulating layer are laminated;
a second substrate arranged so as to face the first substrate, the second substrate having a color filter and a protection layer laminated thereon;
a liquid crystal interposed between the first substrate and the second substrate;
a seal material provided between the first substrate and the second substrate so as to seal the liquid crystal;
a liquid crystal injection inlet formed on an outer circumference of the seal material as an opening for injecting the liquid crystal;
a first protrusion formed of at least one of the metallic layer and the insulating layer in the vicinity of each side of the liquid crystal injection inlet on the first substrate, the first protrusion extending in a direction inwardly from the outer circumference and protruding toward the second substrate; and
a second protrusion formed of at least one of the color filter and the protection layer on a position facing the first protrusion on the second substrate, the second protrusion protruding toward the first substrate.

(2) The liquid crystal display device according to (1), wherein
the first substrate comprises:
a transparent substrate;
a first metallic layer that is a metallic layer forming a gate electrode laminated on the transparent substrate;
the insulating layer laminated on the first metallic layer and the transparent substrate and insulating the first metallic layer;
a semiconductor layer laminated on the first metallic layer and the insulating layer;
a second metallic layer that is a metallic layer laminated on the insulating layer and the semiconductor layer and forming at least one of a source electrode and a drain electrode; and
a passivation layer laminated on the semiconductor layer and the second metallic layer, and
the first protrusion comprises:
the insulating layer;
the semiconductor layer as the metallic layer; and
the passivation layer.

(3) The liquid crystal display device according to (2), wherein
the first protrusion further comprises:
the first metallic layer; and
the second metallic layer.

(4) The liquid crystal display device according to (2), wherein the first protrusion has a recessed portion formed on a portion of a surface of the passivation layer facing the second protrusion.

(5) The liquid crystal display device according (1), wherein
the first protrusion is provided in plurality on the first substrate,
a first connecting part is formed so as to fill space between the first protrusions adjacent to each other on an inner end portion thereof in an injection direction of the liquid crystal,
the second protrusion is provided in plurality on the second substrate, and
a second connecting part is formed so as to fill space between the second protrusions adjacent to each other on an inner end portion thereof in the injection direction of the liquid crystal.

(6) An electronic apparatus including a liquid crystal display device, the liquid crystal display device comprising:
a first substrate on which a metallic layer and an insulating layer are laminated;

a second substrate arranged so as to face the first substrate, the second substrate having a color filter and a protection layer laminated thereon;

a liquid crystal interposed between the first substrate and the second substrate;

a seal material provided between the first substrate and the second substrate so as to seal the liquid crystal;

a liquid crystal injection inlet formed on an outer circumference of the seal material as an opening for injecting the liquid crystal;

a first protrusion formed of at least one of the metallic layer and the insulating layer in the vicinity of each side of the liquid crystal injection inlet on the first substrate, the first protrusion extending in a direction inwardly from the outer circumference and protruding toward the second substrate; and a second protrusion formed of at least one of the color filter and the protection layer on a position facing the first protrusion on the second substrate, the second protrusion protruding toward the first substrate.

(7) A method for manufacturing a liquid crystal display device that comprises:

a first substrate having a metallic layer and an insulating layer laminated thereon;

a second substrate disposed so as to face the first substrate and having a color filter and a protection layer laminated thereon;

a liquid crystal interposed between the first substrate and the second substrate;

a seal material provided between the first substrate and the second substrate so as to seal the liquid crystal; and a liquid crystal injection inlet formed on an outer circumference of the seal material as an opening for injecting the liquid crystal, the method for manufacturing the liquid crystal display device comprising:

manufacturing the first substrate by laminating the metallic layer and the insulating layer on a substrate; and manufacturing the second substrate by laminating the color filter and the protection layer on a substrate, wherein at the manufacturing of the first substrate, a first protrusion protruding toward the second substrate and extending in a direction inwardly from the outer circumference is formed in the vicinity of each side of the liquid crystal injection inlet on the first substrate, by laminating at least one of the metallic layer and the insulating layer, and at the manufacturing of the second substrate, a second protrusion protruding toward the first substrate is formed on the second substrate on a position facing the first protrusion, by laminating at least one of the color filter and the protection layer.

A liquid crystal display device, a method for manufacturing the liquid crystal display device, and an electronic apparatus according to the present disclosure can provide a configuration capable of suppressing the progress of creases generated in a filling material, thereby preventing bubbles from entering the liquid crystal display device, which is a configuration easy to be manufactured.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:

a first substrate on which a metallic layer and an insulating layer are laminated;

a second substrate arranged so as to face the first substrate, the second substrate having a color filter and a protection layer laminated thereon;

a liquid crystal interposed between the first substrate and the second substrate;

a seal material provided between the first substrate and the second substrate so as to seal the liquid crystal, the seal material having a first end and a second end that are opposed to each other in a first direction;

a liquid crystal injection inlet formed between the first end and the second end as an opening for injecting the liquid crystal;

a plurality of first protrusions that are formed of at least one of the metallic layer and the insulating layer and disposed in a first protrusion area that includes a vicinity of each of the first end and the second end on the first substrate and that excludes an inlet area that the first end, the liquid crystal injection inlet, and the second end are aligned in the first direction, each of the first protrusions extending in a second direction outwardly from an outer circumference of the seal material, the second direction intersecting the first direction, and each of the first protrusions protruding toward the second substrate in a vertical direction to the first substrate; and a plurality of second protrusions formed of at least one of the color filter and the protection layer on positions facing the first protrusions, the second protrusions being disposed in a second protrusion area that includes the vicinity of each of the first end and the second end on the second substrate and that excludes the inlet area, each of the second protrusions extending in the second direction outwardly from the outer circumference and each protruding toward the first substrate in the vertical direction.

2. The liquid crystal display device according to claim 1, wherein the first substrate comprises:
a transparent substrate;
a first metallic layer that is a metallic layer forming a gate electrode laminated on the transparent substrate;
the insulating layer laminated on the first metallic layer and the transparent substrate and insulating the first metallic layer;
a semiconductor layer laminated on the first metallic layer and the insulating layer;
a second metallic layer that is a metallic layer laminated on the insulating layer and the semiconductor layer and forming at least one of a source electrode and a drain electrode; and
a passivation layer laminated on the semiconductor layer and the second metallic layer, and the first protrusion comprises:
the insulating layer;
the semiconductor layer as the metallic layer; and
the passivation layer, which are sequentially stacked on the first substrate.

3. The liquid crystal display device according to claim 2, wherein the first protrusion further comprises:
the first metallic layer; and
the second metallic layer, and the first metallic layer, the insulation layer, the semiconductor layer, the passivation layer, and second metallic layer are stacked sequentially on the first substrate.

4. The liquid crystal display device according to claim 2, wherein the first protrusion has a recessed portion formed on a portion of a surface of the passivation layer facing the second protrusion, and the recessed portion is filled with a filling material.

5. The liquid crystal display device according claim 1, wherein each of the first protrusions has a first height in the vertical direction, a first connecting part having a first connecting height in the vertical direction is formed so as to fill space between the first protrusions adjacent to each other on an inner end portion thereof in an injection direction of the liquid crystal, each of the second protrusions has a second height in the vertical direction, a second connecting part having a second connecting height in the vertical direction is formed so as to fill space between the second protrusions adjacent to each other on an inner end portion thereof in the injection direction of the liquid crystal, the first height is greater than the first connecting height, and the second height is greater than the second connecting height.

6. The liquid crystal display device according to claim 1, wherein a filling material is filled between the first protrusions and the second protrusions which are apart in the vertical direction.

7. An electronic apparatus including a liquid crystal display device, the liquid crystal display device comprising:

a first substrate on which a metallic layer and an insulating layer are laminated;

a second substrate arranged so as to face the first substrate, the second substrate having a color filter and a protection layer laminated thereon;

a liquid crystal interposed between the first substrate and the second substrate;

a seal material provided between the first substrate and the second substrate so as to seal the liquid crystal, the seal material having a first end and a second end that are opposed to each other in a first direction;

a liquid crystal injection inlet formed between the first end and the second end as an opening for injecting the liquid crystal;

a plurality of first protrusions that are formed of at least one of the metallic layer and the insulating layer and disposed in a first protrusion area that includes a vicinity of each of the first end and the second end on the first substrate and that excludes an inlet area that the first end, the liquid crystal injection inlet, and the second end are aligned in the first direction, each of the first protrusions extending in a second direction outwardly from an outer circumference of the seal material, the second direction intersecting the first direction, and each of the first protrusions protruding toward the second substrate in a vertical direction to the first substrate; and a plurality of second protrusions formed of at least one of the color filter and the protection layer on positions facing the first protrusions, the second protrusions being disposed in a second protrusion area that includes the vicinity of each of the first end and the second end on the second substrate and that excludes the inlet area, each of the second protrusions extending in the second direction outwardly from the outer circumference and each protruding toward the first substrate in the vertical direction.

8. The electronic apparatus according to claim 7, wherein a filling material is filled between the first protrusions and the second protrusions which are apart in the vertical direction.

9. A method for manufacturing a liquid crystal display device that comprises:

a first substrate having a metallic layer and an insulating layer laminated thereon;

a second substrate disposed so as to face the first substrate and having a color filter and a protection layer laminated thereon;

a liquid crystal interposed between the first substrate and the second substrate;

a seal material provided between the first substrate and the second substrate so as to seal the liquid crystal, the seal material having a first end and a second end that are opposed to each other in a first direction; and a liquid crystal injection inlet formed between the first end and the second end as an opening for injecting the liquid crystal, the method for manufacturing the liquid crystal display device comprising:

manufacturing the first substrate by laminating the metallic layer and the insulating layer on a substrate; and manufacturing the second substrate by laminating the color filter and the protection layer on a substrate, wherein the manufacturing of the first substrate includes forming a plurality of first protrusions each protruding toward the second substrate in a vertical direction to the first substrate and extending in a second direction outwardly from an outer circumference of the seal material, the second direction intersecting the first direction, and the first protrusions being formed in a first protrusion area that includes a vicinity of each of the first end and the second end on the first substrate and that excludes an inlet area that the first end, the liquid crystal injection inlet, and the second end are aligned in the first direction, by laminating at least one of the metallic layer and the insulating layer, and wherein the manufacturing of the second substrate includes forming a plurality of second protrusions each extending in the second direction outwardly from the outer circumference and each protruding toward the first substrate in the vertical direction, the second protrusions being formed on the second substrate on positions facing the first protrusions, and the second protrusions being disposed in a second protrusion area that includes the vicinity of each of the first end and the second end on the second substrate and that excludes the inlet area, by laminating at least one of the color filter and the protection layer.

10. The method for manufacturing a liquid crystal display device according to claim 9, further comprising:

filling the liquid crystal between the first substrate and the second substrate through the liquid crystal injection inlet; and filling a filling material between the first protrusions and the second protrusions which are apart in the vertical direction.

* * * * *